United States Patent [19]

Ikeda et al.

[11] Patent Number: 4,800,435
[45] Date of Patent: Jan. 24, 1989

[54] METHOD OF DRIVING A TWO-DIMENSIONAL CCD IMAGE SENSOR IN A SHUTTER MODE

[75] Inventors: Sadayuki Ikeda; Hidehiko Inoue; Kiyotake Nagai; Hiroshi Nakajima; Yasuichi Ushiyama, all of Tokyo, Japan

[73] Assignee: NEC Corporation, Tokyo, Japan

[21] Appl. No.: 932,671

[22] Filed: Nov. 20, 1986

[30] Foreign Application Priority Data

Nov. 20, 1985 [JP] Japan .................... 60-261779
Aug. 18, 1986 [JP] Japan .................... 61-193545
Oct. 3, 1986 [JP] Japan .................... 61-236729

[51] Int. Cl.$^4$ ............................ H04N 3/14
[52] U.S. Cl. .................... 358/213.19; 358/213.26; 358/213.29
[58] Field of Search ............ 358/213.23, 213.26, 358/213.29, 213.19, 211

[56] References Cited

U.S. PATENT DOCUMENTS

| | | | |
|---|---|---|---|
| 4,322,753 | 3/1982 | Ishihara | 358/213 |
| 4,335,405 | 6/1982 | Sakane et al. | 358/213.19 |
| 4,363,034 | 12/1982 | Grancoin et al. | 358/213.19 |
| 4,547,677 | 10/1985 | Parker | 358/213.29 |
| 4,597,013 | 6/1986 | Matsumoto | 358/213.23 |
| 4,603,343 | 7/1986 | Matsumoto et al. | 358/213.23 |
| 4,686,573 | 8/1987 | Murayama et al. | 358/213.29 |

FOREIGN PATENT DOCUMENTS

| | | | |
|---|---|---|---|
| 0122085 | 7/1984 | Japan | 358/213.29 |
| 0154882 | 9/1984 | Japan | 358/213.29 |
| 8300267 | 1/1983 | PCT Int'l Appl. | 358/213.29 |

Primary Examiner—Jin F. Ng
Assistant Examiner—Stephen Brinich
Attorney, Agent, or Firm—Burns, Doane, Swecker & Mathis

[57] ABSTRACT

An image sensing device for a TV camera and method of driving the same is disclosed whereby the effective charge accumulation time in each light-sensing row in the imaging area can be reduced thereby eliminating fuzzy images produced when fast moving objects are picked up. The driving circuit of the imaging device gives the sensor a shutter function of less than 1/60 second and up to 1/2000 second exposure time without changing the structure of the sensor. There is provided a method in which charges accumulated in each row of the light-sensing elements are taken out and discarded at an optional time during an active video period, leaving an effective charge accumulation period of less than 1/60 second.

7 Claims, 10 Drawing Sheets

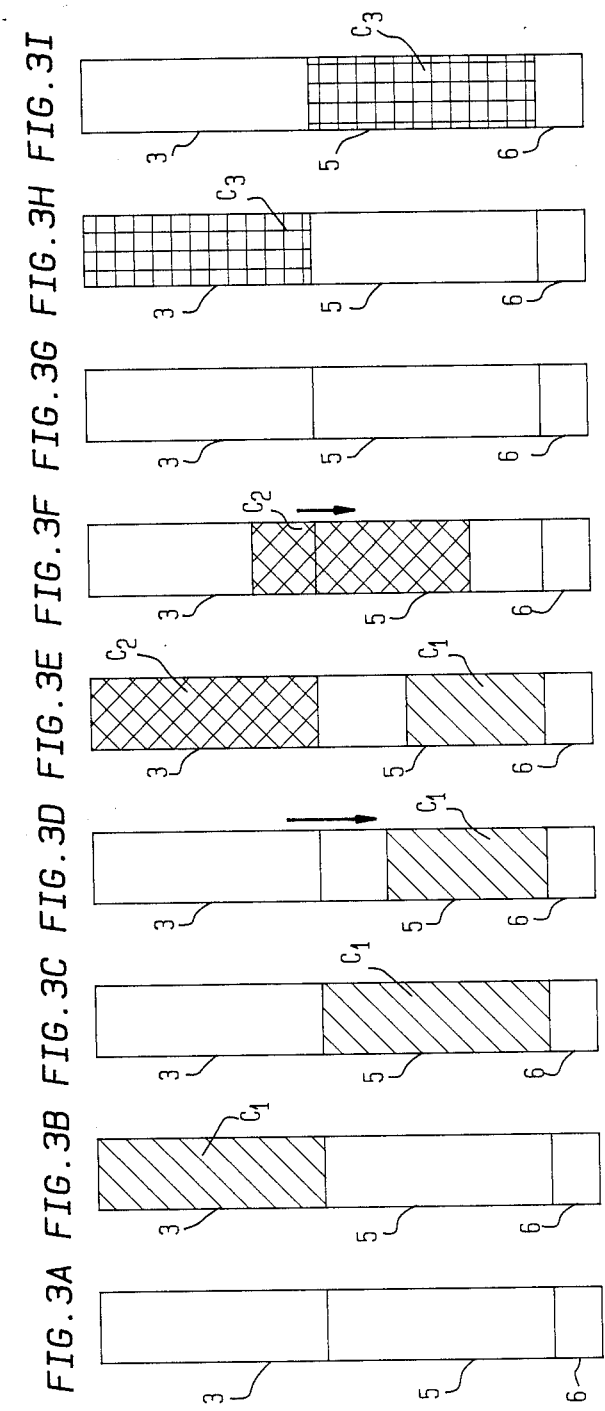

METHOD OF DRIVING A TWO-DIMENSIONAL CCD IMAGE SENSOR IN A SHUTTER MODE

BACKGROUND OF THE INVENTION

The present invention relates to a two-dimensional charge-coupled device (CCD) image sensor which is used in an image-picking-up apparatus such as a TV camera and a VTR camera, and more specifically, to a method of driving an interline-transfer type CCD image sensor.

The two-dimensional CCD image sensor, which is now finding applications in TV cameras and in VTR cameras, includes an imaging area (photosensitive area) having a plurality of rows of light-sensing elements which accumulate electrical charges of amounts corresponding to intensity of irradiated lights for a predetermined period of time, a storage area (memory area) having a plurality of shift registers each receiving the accumulated charges from each row of the imaging area and storing them, and a readout register receiving the stored charges from each shift register and outputting a video signal. Such a CCD image sensor is disclosed in the U.S. Pat. No. 4,322,753 assigned to the same assignee. In operation of such CCD image sensor, the period of time of the charge accumulation in each light-sensing row in the imaging area is fixed to one television field time, which corresponds to 1/60 second exposure time in a mechanical shutter of a camera. When a quickly moving object is picked-up, therefore, a fuzzy video signal is produced to deteriorate the resolution. In order to remove such defect, it is necessary that the CCD image sensor has a shutter function of more than 1/60 second and up to 1/2000 second exposure time. For this purpose, it has been attempted to provide a mechanical shutter in front of the CCD image sensor. However, the camera becomes bulky and the manufacturing cost increases.

SUMMARY OF THE INVENTION

An object of the present invention is to provide a method of driving a CCD image sensor which allows it to shorten the charge-accumulation time in the imaging area without using a mechanical shutter.

Another object of the present invention is to provide a driving circuit for a CCD image sensor which gives the sensor a shutter function of more than 1/60 second and up to 1/2000 second exposure time without changing the structure of the sensor.

According to the present invention, there is provided a method of driving a CCD image sensor in which charges accumulated in each row of the light-sensing elements are taken to at any time point when the stored charges are transferred from the storage area to the readout register and/or through the readout register toward the video signal output and the taken-out charges are transferred from the imaging area to the storage area in synchronism with the transfer of the stored charges from the storage area to the readout register and/or through the readout register. The taken-out charges are discarded during a vertical blanking period between the adjacent field periods. The CCD image sensor itself may have basically the same structure as the prior art structure.

According to the present invention, there is obtained a circuit for driving a CCD image sensor, which comprises a high-speed pulse generating circuit generating a first high-speed pulse train (sweeping pulse train) having pulses to be used to discard non-signal charges during the vertical blanking period and a second high-speed pulse train (high-speed transfer pulse train) having pulses of a number equal to the number of the light-sensing elements in each row and used to quickly transfer the charges from the imaging area to the storage area in the vertical blanking period and a gate pulse generating circuit generating a first gate pulse to take the accumulated charges out of each row of light-sensing elements at a time point after the first high-speed pulse train is generated and before the second high-speed pulse train is generated and a second gate pulse to take out non-signal charges accumulated in each row of the light-sensing elements at an arbitrary time point after the generation of the second high-speed pulse train and before the generation of the first high-speed pulse train, during the field period (active video period).

The imaging area may have twice the number of lightsensing elements. In this case, each row is arrayed with alternately arranged light-sensing elements for odd field and even field, and in the odd field period the accumulated charges are taken out of half of the elements in each row, while in the even field period out of the other half. The second high-speed pulse train has pulses of a number equal to a half of the number of the elements in each row and the second gate pulse is generated only once in any one of the odd and even field periods, that is, once in the frame period.

BRIEF DESCRIPTION OF THE DRAWINGS

FIGS. 3(a) to 3(i) are diagrams showing the transfer of electric charges for explaining operation of the present invention;

DESCRIPTION OF THE PREFERRED EMBODIMENTS

Figure 1A:
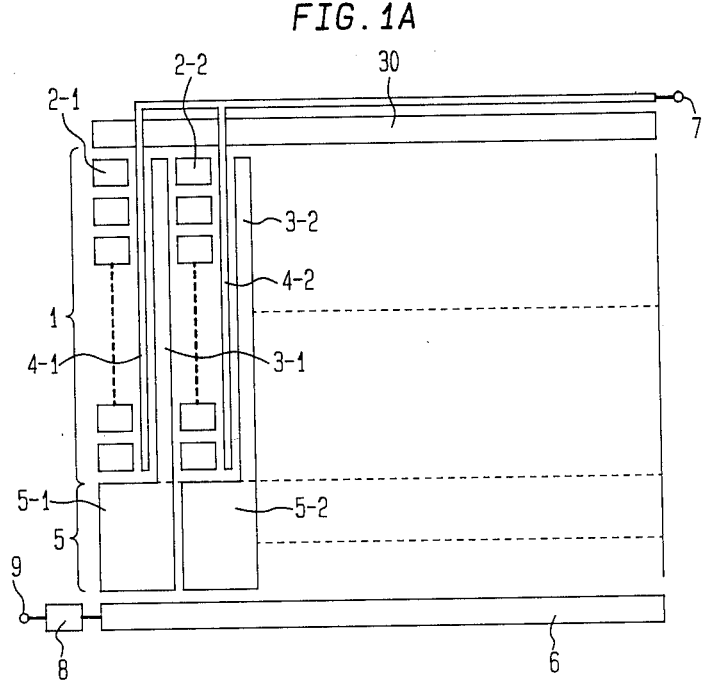
FIG. 1(a) is a schematic diagram illustrating a structure of a CCD image sensor to which the present invention is adapted.
Figure 1B:
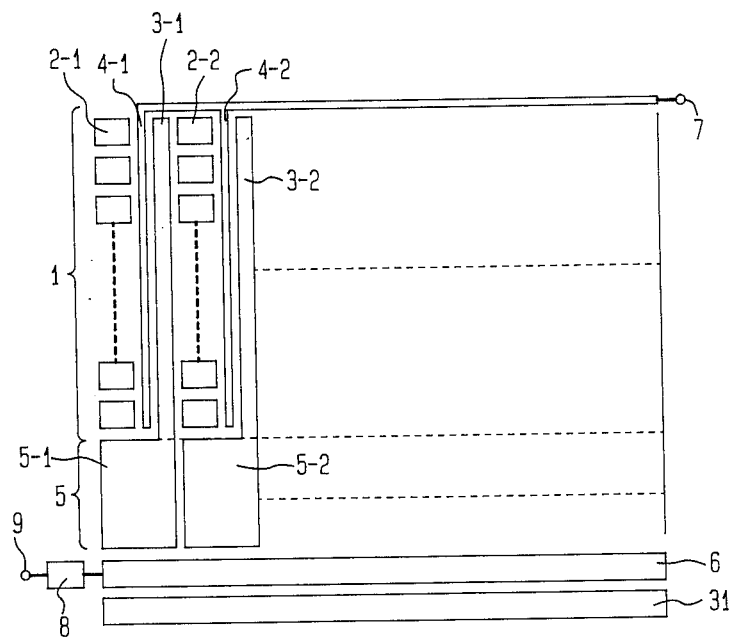
FIG. 1(b) is a schematic diagram of another structure of a CCD image sensor.

Referring to FIGS. 1(a) and 1(b), a CCD image sensor, to which the present invention is adapted, comprises an images area 1, a storage area 5 and a readout register 6. The imaging area 1 includes a plurality of rows of photodiodes 2-1, 2-2, ..., a plurality of transfer registers 3-1, 3-2, ... each provided along each row of photodiodes (hereinafter referred to as vertical transfer registers because they extend vertically on the drawing), and a plurality of transfer gates 4-1, 4-2, ... each provided between each row of the photodiodes and each associated vertical transfer register and electrically connected in common to a terminal 7. When a gate pulse is applied to the terminal 7, electrical charges accumulated in the photodiodes are transferred from each row of the photodiodes to the associated vertical transfer register simultaneously. The storage area 5 includes a plurality of shift register 5-1, 5-2, ... coupled at their one end to one end of the vertical transfer registers, respectively, and has a capacity (total storages of the shift registers) corresponding to a number of picture elements constituting one television field. The readout register, or horizontal transfer register, 6 is provided at the other end of the shift registers 5-1, 5-2, ..., extending horizontally on the drawing. The accumulated charges are transferred through the vertical registers and the shift registers into the readout register 6, transferred via the readout register 6 to an output amplifier 8, and derived from an output terminal 9 as a video signal.

In FIG. 1(a), a discard drain region 30 is provided in common at the other ends of the vertical transfer registers 3-1, 3-2, .... Unnecessary (non-signal) charges are swept away from the vertical transfer registers and from the shift registers into the drain region 30 to vanish.

In FIG. 1(b), a discard drain region 31 is positioned along the readout register 6 and coupled to the register 6 via a transfer gate (not shown) which transfers unnecessary (non-signal) charges from the shift registers 5-1, 5-2, ... to the drain region 31 where they vanish.

In FIG. 1, the number of the photodiodes 2 in each row or array is, for example, 512 to meet the NTSC system and the number of stages in each vertical transfer register 3 is 256. The 512 photodiodes are classified into 256 photodiodes for the odd field (odd field photodiodes) and the other 256 photodiodes for the even field (even field photodiodes), and each odd field photodiode and each even field photodiode are alternately arranged in each row. Accumulated electric charges are transferred from the 256 odd field photodiodes to the 256-stages vertical transfer register 3 in the odd field period and from the 256 even field photodiodes to the same 256-stages vertical transfer register in the even field period. In this case, an accumulation period of the charges in the photodiodes corresponds to one television frame period in the prior art. On the other hand, it is possible that the electric charges accumulated in both of the odd field photodiodes and the even field photodiodes are simultaneously transferred to the vertical transfer register 3 in each of the odd and even fields. In this case, a video signal of one picture element is produced by combining two electric charges of the odd field photodiode and the even field photodiode, and the combination of the odd field photodiode and the even field photodiode is changed dependent on the odd television field and the even television field. Therefore, the accumulation period in this case corresponds to one television field period.

Figure 2A:
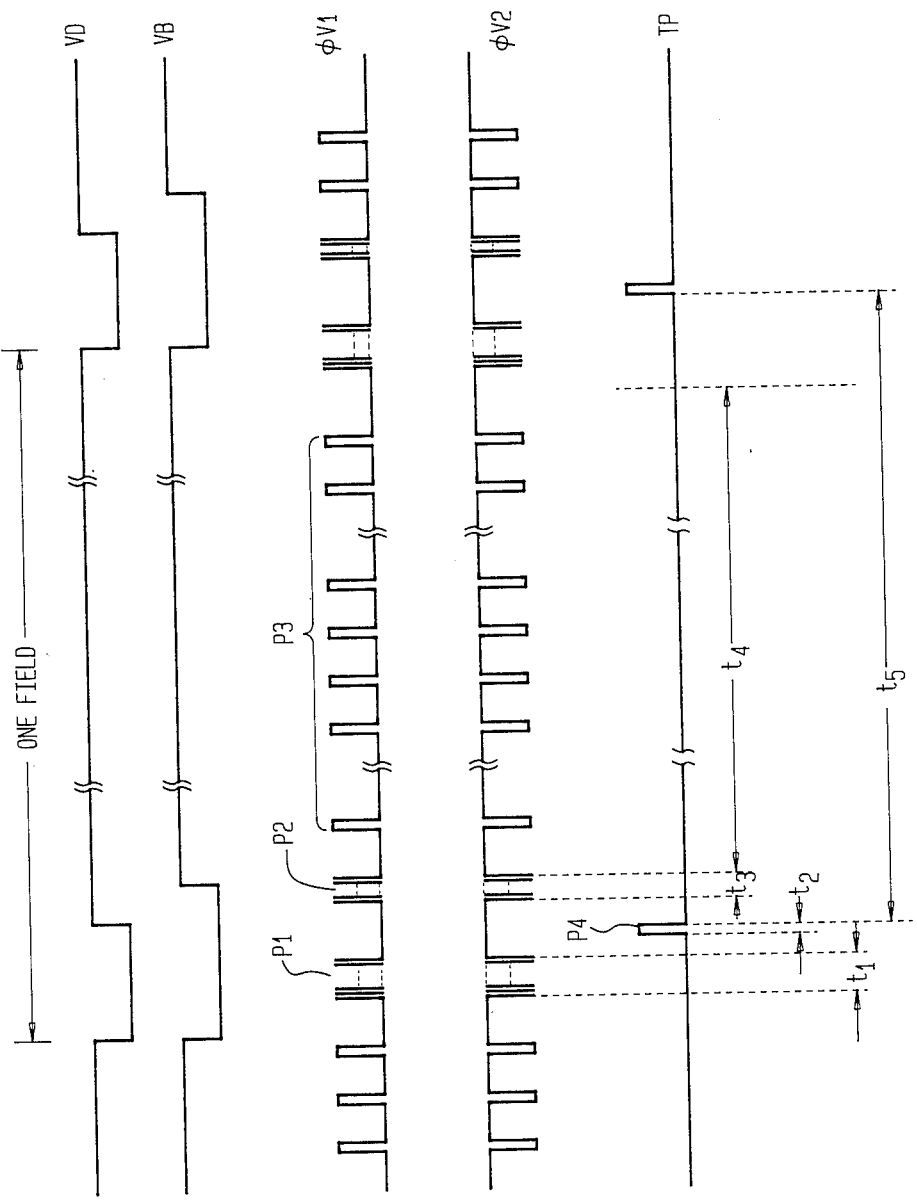
FIG. 2(a) is a diagram showing driving pulses for driving the CCD image sensor shown in FIG. 1 according to a prior art.

Operation of the CCD image sensor shown in FIGS. 1(a) and 1(b) according to a conventional driving method will now be described in conjunction with FIG. 2(a). FIG. 2(a) shows a vertical driving pulse VD, a vertical blanking signal VB, two transfer pulses $\phi V1$ and $\phi V2$ of two phases for the vertical transfer registers 3 and the memory section 5, and a transfer gate pulse TP for transferring the accumulated electric charge from the photodiodes 2 to the vertical transfer registers 3. In the vertical blanking period at the start of a field period, the electric charges stored in the vertical transfer registers 3 and/or stored in the memory section 5 are swept away by excess charge sweeping pulses P1. These pulses P1 are applied to both the vertical transfer registers 3 and the shift registers 5. In case of FIG. 1(a) their phase is opposite to a normal phase, that is, the phase transferring the charges to a reverse direction (upwards in the drawing). In case of FIG. 1(b) their phase is normal. The number of the sweeping pulses P1 is greater than a total number of stages contained in both the registers 3 and 5 in each row. Since the number of stages in the register 3 is favorably equal to that in the register 5, the number of pulses P1 is larger than twice the number of stages in the vertical transfer register 3. For example, if the number of effective scanning lines is set to be 256 in one television field for the NTSC system, the number of pulses P1 is selected to be greater than 512. For sweeping, in the case of FIG. 1(a), the electric charges stored in the vertical transfer registers 3 and/or stored in the memory section 5 are transferred upward to the drain 30. In the case of FIG. 1(b), the electric charges are transferred downward to the drain 31. In this case, a gate (not shown) is practically provided between the horizontal transfer register 6 and the overflow drain region 31 and a gate pulse is applied to this gate to pass the electric charges to the drain region 31 when the sweeping operation is performed.

After the sweeping operation, the electric charges accumulated in the photodiodes 2 are transferred to the vertical transfer register 3 by a pulse P4 of the transfer gate pulse TP. The amount of the electric charges accumulated in the photodiodes 2 is dependent upon the quantity of light irradiating during a previous one television field. The electric charges transferred to the vertical transfer registers 3 are then quickly transferred to the shift register having 256 vertical stages in the memory section 5 in response to high-speed transfer pulses P2. Therefore, the high-speed transfer pulses P2 include 256 pulses. Thereafter, the electric charges transferred to the memory section 5 are shifted to the horizontal transfer register 6 in response to transfer pulses P3 synchronized with a horizontal scanning timing. In each horizontal scanning period, the horizontal transfer register 6 transfers the electric charges in the horizontal direction by a clock of, for example, 7.2 MHz to deliver a video signal at the output terminal 9.

In FIG. 2(a), therefore, a period $t_1$ denotes the excess charge sweeping period, a period $t_2$ denotes the transfer period from the photodiodes 2 to the vertical transfer register 3, a period $t_3$ denotes the high-speed transfer period from the vertical transfer register 3 to the memory section 5, and a period $t_4$ denotes the transfer period from the memory register 5 to the horizontal register 6 determined by the horizontal scanning timing (active video period). The accumulation period in the photodiodes 2 is denoted by a period $t_5$, and the electric charges accumulated in the photodiodes 2 for the period $t_5$ are transferred to the vertical transfer register 3 in the next television field. In the conventional driving method, the accumulation period $t_5$ remains constant and cannot be changed.

Figure 2B:
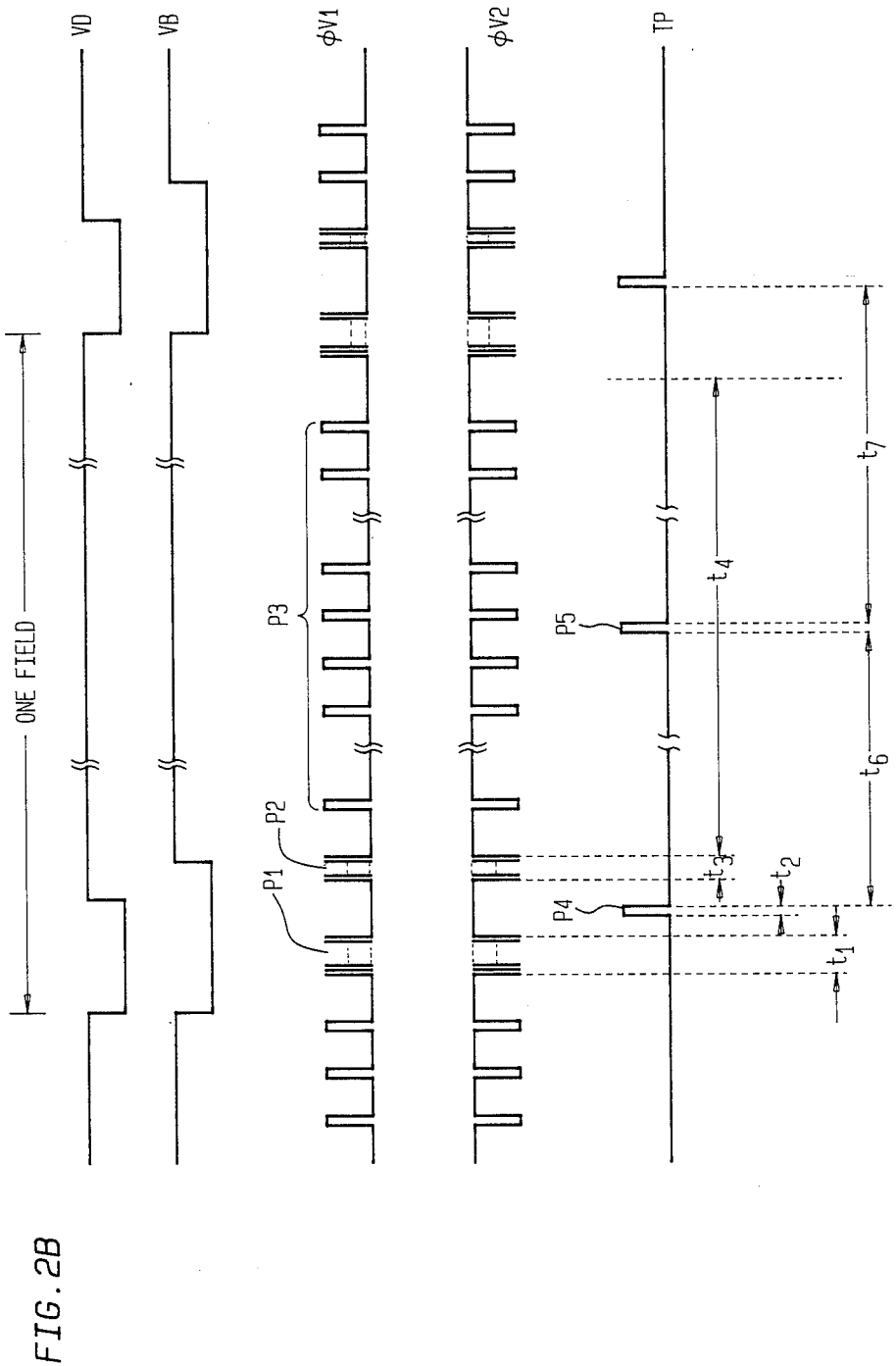
FIG. 2(b) is a diagram showing driving pulses for the CCD image sensor of FIG. 1 according to the present invention.

Next, a driving method according to the present invention will be explained with reference to FIG. 2(b), wherein the same pulses and the same periods as those shown in FIG. 2(a) are indicated by the same reference letters. The feature of the invention resides in the addition of a charge transfer pulse P5 which is applied to the transfer gate terminal 7 as a transfer gate pulse TP during the active video period $t_4$, that is, after the application of the high-speed transfer pulses P2 and before the application of the sweeping pulses P1. According to the present invention, there is no need to modify the structure of the CCD image sensor. This transfer pulse P5 transfers the charges accumulated for a period $t_6$, from the application of the normal transfer pulse P4 up to the application thereof, from the photodiodes 2 to the vertical transfer registers 3, which charges are to be swept away as mentioned below. Therefore, these charges are non-signal charges, and charges accumulated for a period $t_7$ which is equal to $t_5$ (FIG. 2(a)) minus $t_6$ are effective to become a video signal. Thus, $t_6$ denotes a needless accumulation period and the period $t_7$ denotes an effective accumulation period. As shown in FIGS. 2(a) and 2(b), the effective accumulation period $t_7$ can be arbitrarily shortened, by changing the timing of the charge transfer pulse P5.

Operation of the present invention will now be described with reference also to FIGS. 3(a) to 3(i) in which the upper halves represent the vertical transfer register 3 and the lower halves represent the memory section 5. In these Figures, the width corresponds to one picture element. FIG. 3(a) shows the condition where the electric charges have been swept away by the excess charge sweeping pulse P1 (FIG. 2(b)), and no electric charge is left in the register 3 and in the memory section 5. FIG. 3(b) shows the condition where the electric charges accumulated in the photodiodes 2 are transferred to the vertical transfer register 3 in response to the transfer gate pulse P4, and the electric charges denoted by C1 are stored in the register 3. FIG. 3(c) shows the next step where the electric charges C1 are transferred to the memory section 5 in response to the high-speed transfer pulses P2. Thereafter, the electric charges C1 stored in the memory section 5 are shifted to the horizontal transfer register 6 in response to the transfer pulses P3 as shown in FIG. 3(d), and the video signal is delivered from the horizontal transfer register 6. It is assumed that the additional charge sweeping pulse P5 is applied when the electric charges of n lines (n horizontal scanning periods) have been transferred to the horizontal transfer register 6. The electric charges accumulated in the photodiodes 2 up to this timing are transferred to the vertical transfer register 3 as shown in FIG. 3(e). In FIG. 3(e), C2 represents the non-signal electric charges transferred into the register 3. The non-signal electric charges C2 are the charges accumulated in the photodiode 2 during the period $t_6$ of FIG. 2(b). After the condition of FIG. 3(e), the electric charges C1 in the memory section 5 are successively shifted to the horizontal transfer register 6 in response to the transfer pulses P3, and at the same time the non-signal charges C2 are downwardly shifted towards the memory section 5. As a result, a condition shown in FIG. 3(f) is obtained at the end of one television field.

After the step of FIG. 3(f), excess charge sweeping pulses P1' of the next field are applied as shown in FIG. 2(b), whereby the non-signal electric charges C2 in the vertical transfer register 3 and the memory section 5 are all swept away. As a result the condition of FIG. 3(g) is obtained. Then, a transfer gate pulse P4' of the next field is applied, and the electric charges accumulated in the photodiodes 2 is transferred to the vertical transfer register 3 as shown in FIG. 3(h). This electric charges are denoted by C3 in FIG. 3(h) and are accumulated during the period $t_7$ (FIG. 2(b)) after the charge sweeping pulse P5 is applied. The electric charges C3 are then transferred to the memory section 5 in response to a next high-speed transfer pulses P2' as shown in FIG. 3(i) and are delivered from the horizontal transfer register 6 as a video signal during the next television field. Thus, the electric charges C3 accumulated only after the application of the pulse P5 are used as effective charges to produce a video signal. Thereafter, the effective exposure time corresponds to $t_7$ which can be designated by changing the time point of the application of the pulse P5 which in turn corresponds to an electronic shutter signal.

Even in this embodiment, other unnecessary electric charges such as a dark current component and a smear component are swept away by the excess charge sweeping pulses P1, P1', as a matter of course. It is also allowable to add a plurality of charge transfer pulses P5. In this case, a period from the last charge transfer pulse P5 serves as an effective accumulation time $t_7$, i.e., serves as an exposure time.

Figure 4:
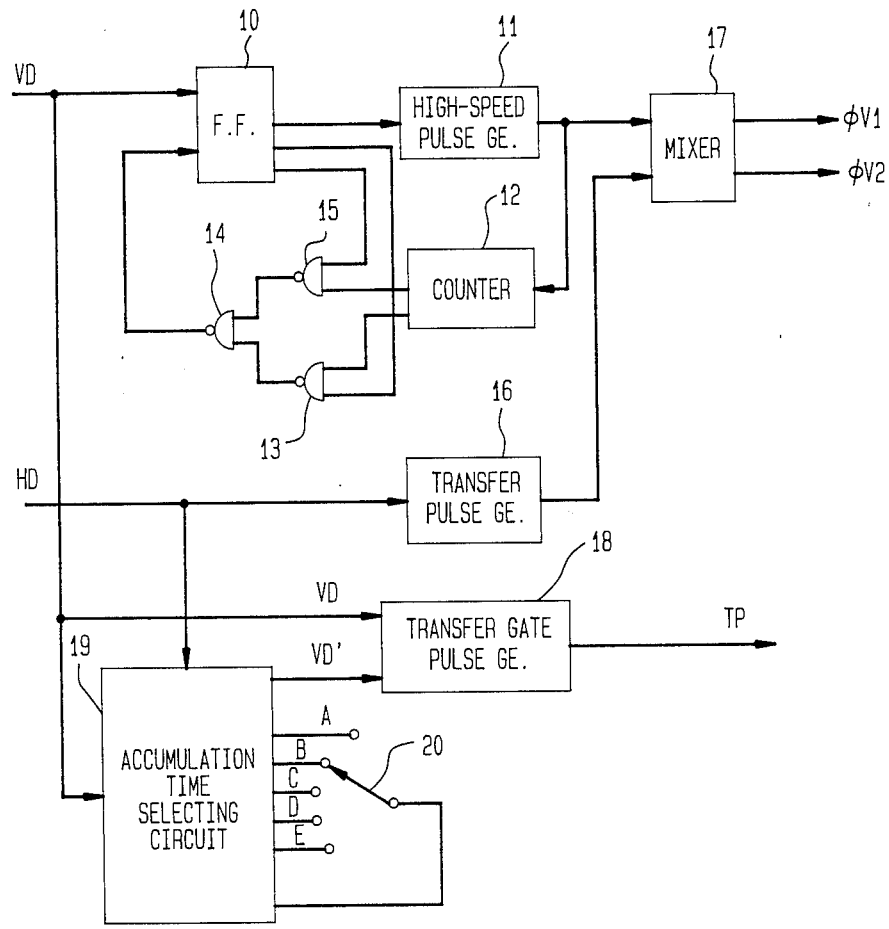
FIG. 4 is a block diagram of a driving circuit which produces pulses to drive the CCD image sensor according to the present invention.

FIG. 4 is a block diagram showing a driving circuit for obtaining the driving pulses shown in FIG. 2(b). In FIG. 4, a flip-flop 10 which receives a vertical driving pulse VD is set at the front edge thereof, and enables a high-speed pulse generating circuit 11 to produce high-speed pulses of a frequency of, for example, 1.5 MHz. A high-speed pulse counter 12 counts the high-speed pulses, and produces two outputs when it has counted 256 and 512 pulses. Responsive to a control signal from the flip-flop 10, first, a timing of 512 pulses is detected by a gate 13, whereby the flip-flop is reset via a gate 14. The flip-flop 10 is set again by the rear edge of the vertical driving pulse VD, and the high-speed pulse generating circuit 11 produces high-speed pulses. The other output produced by the high-speed pulse counter 12 when, it has counter 256 pulses, is detected by a gate 15 under a control signal from the flip-flop 10, and the flip-flop 10 is reset via the gate 14. The two control signal supplied from the flip-flop 10 the gates 13 and 15 change their states so that the above-mentioned sequence can be carried out. Upon receipt of a horizontal driving signal HD, a transfer pulse generating circuit 16 produces the transfer pulse P3 based upon the timing thereof. A mixing circuit 17 mixes the excess charge sweeping pulses P1, the high-speed transfer pulses P2 from the high-speed pulse generating circuit 11, and the transfer pulses from the transfer pulse generating circuit 16 together, and produces transfer pulses $\phi V1$ and $\phi V2$. In order to drive a CCD image sensor, transfer pulses of two phases, three phases, or four phases are selectively used depending upon the structure of the CCD image sensor or function to be derived from the CCD image sensor. The mixing circuit 17 produces transfer pulses having a desired number of phases and a desired relationship of phases.

A transfer gate pulses generating circuit 18 which receives the vertical driving signal VD generates the transfer gate pulse P4 having a predetermined phase difference as shown in FIG. 2(b). The transfer gate pulse generating circuit 18 also generates the needless charge transfer pulse P5 in response to a delayed vertical driving signal VD' delivered from an accumulation time selecting circuit 19. In the accumulation time selecting circuit 19, the delay time of the delayed vertical driving signal VD' is selected by a selector 20. In this embodiment, one of five different times of 1/125, 1/250, 1/500, 1/1000 and 1/2000 seconds is selected by the selector 20. The delay time may be continuously varied in the accumulation time selecting circuit 19, as a matter of course. The circuit 19 can be very easily realized by using a multivibrator or a counter. In this embodiment, the circuit 19 is constituted by the counter which receives the horizontal driving signal HD as a clock signal and the vertical driving signal VD as a clear signal, and produces a carry output as the delayed vertical driving signal VD' while changing an initial bad value depending upon the selecting signals A, B, C, D and E.

In the first embodiment, as described above, the video signal of one picture element is formed from two outputs of two photodiodes, and these two photodiodes forming the video signal of one picture element are differently selected depending upon the odd field and the even field. In the CCD image sensor, furthermore, it can also be attempted to take out a video signal having high resolution in which an odd field video signal and an even field video signal are delivered from the individual odd field and even field photodiodes instead of combining two photodiodes. This method (defined as a frame mode, hereinafter) can increase the resolution in the vertical direction, and is desirable to take out the video signal corresponding to one fixed picture of the television frame. However, in the frame mode, there exists a time difference in the accumulation time between the odd and even fields. This time difference corresponds to movement of about 46 cm when a moving object moves at a speed of 100 km per hour. In this case, the fixed picture of the television frame becomes as shown in FIG. 5(a), in which a split image is disadvantageously obtained.

Figure 5A:
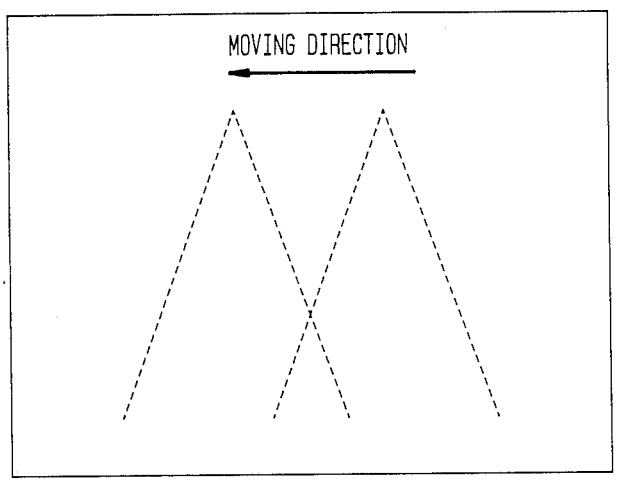
FIG. 5(a) is a diagram showing a video signal of one frame obtained by picking up a quickly moving object relying upon respective accumulations in the odd and even fields.
Figure 5B:
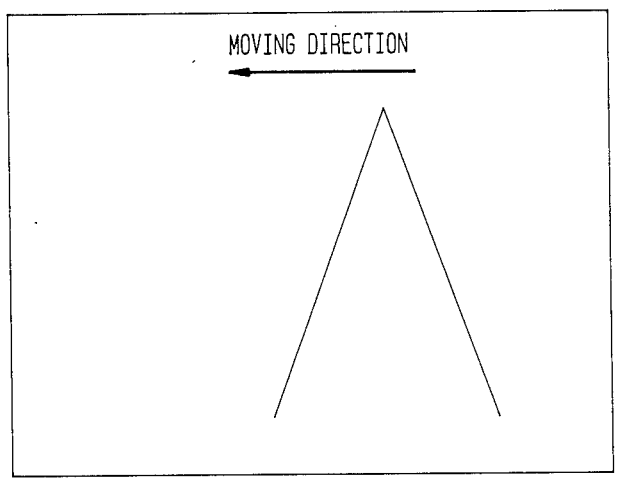
FIG. 5(b) is a diagram showing a video signal of one frame obtained according to a second embodiment of the present invention.
Figure 6:
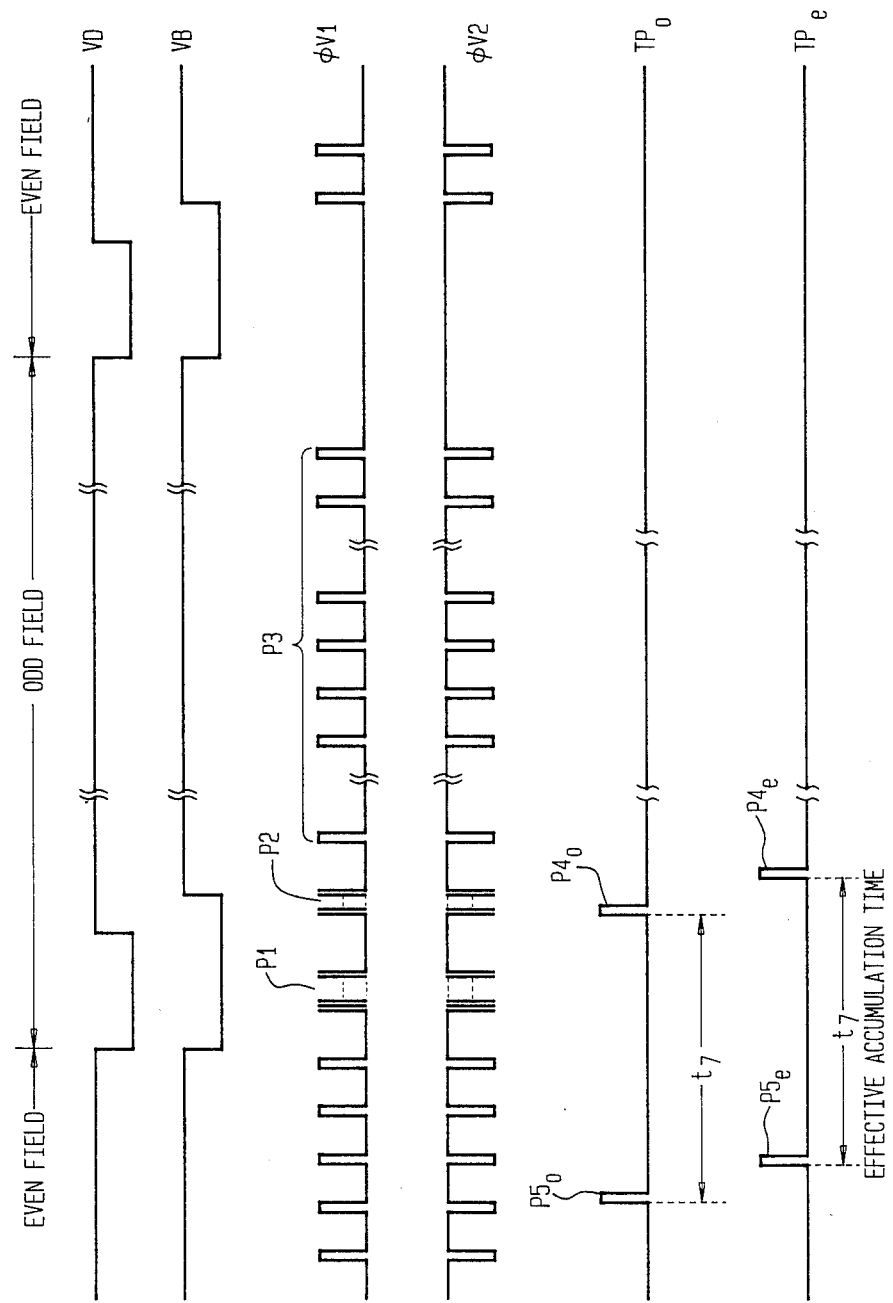
FIG. 6 is a diagram showing driving pulses according to the second embodiment of the present invention.

According to a second embodiment of the present invention, the operation for sweeping away needless electric charges is effected not for each field but once for each frame period to remove the defect of FIG. 5(a). FIG. 5(b) shows one fixed picture of the television frame obtained according to the second embodiment of the present invention. In FIG. 5(b), there is no difference between the odd and even fields. FIG. 6 shows driving pulses for explaining the driving method according to the second embodiment of the present invention, wherein the vertical driving signal VD, the vertical blanking signal VB, and transfer pulses $\phi V1$, $\phi V2$ are the same as those of FIG. 2(b). In this embodiment, the needless charge transfer pulse P5 is added once for each frame to provide a coincident effective accumulation time in the odd field and in the even field. That is, as shown in FIG. 6, the needless charges in the vertical transfer register 3 and the memory section 5 are swept by the sweeping pulses P1 and, then, the electric charges accumulated in the photodiodes for the odd field (the odd field photodiodes) are transferred into the vertical transfer register 3 in response to a transfer gate pulse $P4_O$. Sequentially, the electric charges transferred into the register 3 are transferred to the memory section 5 responsive to high-speed transfer pulses P2. Then, the electric charges accumulated in the photodiodes for the even field (the even field photodiodes) 2 are transferred into the empty vertical transfer register 3 in response to a transfer gate pulse $P4_e$. Thereafter, responsive to transfer pulses P3 contained in two successive fields, a video signal of one television frame is obtained by delivering the electric charges of the odd field and the even field which are stored in the vertical transfer register 3 and the memory section 5, from the horizontal transfer register 6. In the second embodiment, both the needless charge sweeping pulses P1 and the high-speed transfer pulses P2 are not present during a blanking period between the odd field and the even field.

In order to realize such operation, the transfer gate pulse $P4_e$ for the even field is designated to appear after the high-speed transfer pulses P2 so as to transfer the accumulated charges corresponding to the even field into the vertical transfer register 3. Furthermore, needless charge transfer pulses $P5_o$ and $P5_e$ are located before the transfer gate pulses $P4_{o\ and\ P4e}$, and the effective accumulation times are determined by the period $t_7$ between the pulses $P5_o$ and $P4_o$, and between pulses $P5_e$ and $P4_e$. As shown in FIG. 6, since the accumulation times for the odd field and the even field are almost in agreement, a perfect fixed picture of the television frames having high vertical resolution is obtained even when the object moves quickly.

Figure 7:
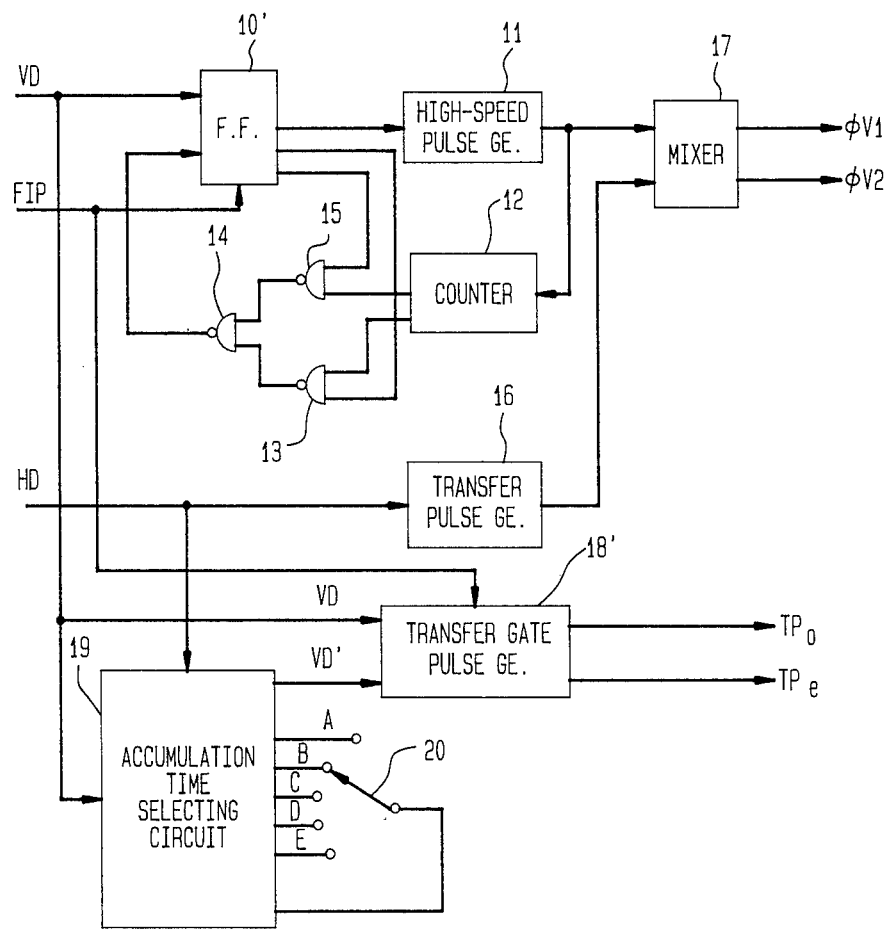
FIG. 7 is a block diagram showing a driving circuit which generates the driving pulses shown in FIG. 6.

FIG. 7 shows a block diagram of a driving circuit for the second driving method according to the second embodiment of the present invention. Circuit elements of FIG. 7 are the same as of the driving circuit of FIG. 4 except for a flip-flop 10' and a transfer gate pulse generating circuit 18' which are served with a field index pulse FIP. In FIG. 7, the needless charge sweeping pulses P1 and the high-speed transfer pulse P2 are generated responsive to the field index pulse FIP only during the odd field. Upon receipt of the field index pulse FIP, the transfer gate pulse generating circuit 18' generates a transfer pulse $P4_o$ during the blanking period from the even field to the odd field. Further, the needless charge transfer pulse $P5_o$ is also generated once during the frame period. With respect to transfer pulses $TP_o$ and $TP_e$ for respective odd and even fields, the transfer pulse $TP_e$ for transferring the accumulated charges for the even field is delayed by about 120 $\mu S$ behind the transfer pulse $TP_o$. Therefore, the transfer pulse $TP_e$ can be generated by utilizing this relationship. According to the second embodiment as described above, the needless electric charges are swept away once during each frame, so that the electric charges can be accumulated for nearly a coincident period of time for the two fields. Namely, a video signal having good resolution is obtained in the frame mode while providing the variable shutter function.

Figure 8:
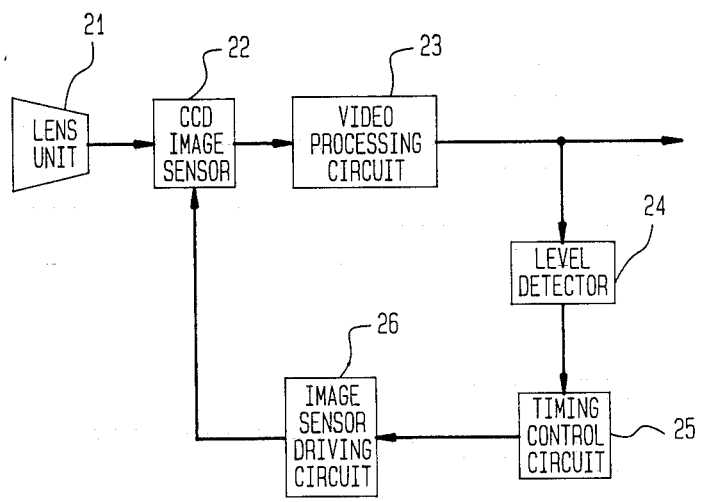
FIG. 8 is a block diagram of a video camera when the driving method of the present invention is adapted to adjusting the sensitivity.
Figure 9:
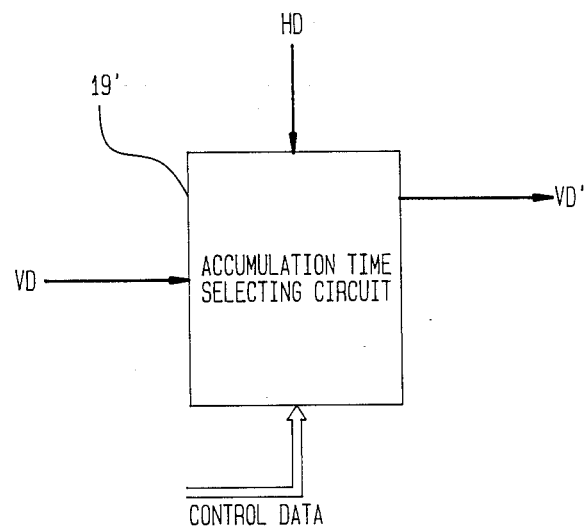
FIG. 9 is a block diagram showing a partial portion of the driving circuit of FIG. 8.

The foregoing description has dealt with the shutter function of the present invention by changing the accumulation time. The present invention, however, can also be adapted to adjusting the sensitivity of a TV camera. That is, in FIG. 2(b), the sensitivity increases if the effective accumulation time $t_7$ is extended and decreases if the effective accumulation time $t_7$ is shortened. The present invention is very advantageous since it involves no modification for the structure of the CCD image sensor. FIG. 8 shows a TV camera apparatus according to a third embodiment of the present invention. In FIG. 8, an image passed through a lens unit 21 is supplied to a CCD image sensor 22 which sends a video signal to a video processing circuit 23. The video signal produced by the video processing circuit 23 is supplied to a level detecting circuit 24 which detects whether the video signal has a level that is greater than a predetermined level or not. The detected result is sent to a timing control circuit 25 which so determines the effective accumulation period t₇ (FIG. 2(b)) so that the level difference detected by the level detecting circuit 24 becomes zero, and which sends a control signal to a driving circuit 26. The driving circuit 26 corresponds to the circuit shown in FIG. 4. In the driving circuit 26 of FIG. 8, the accumulation time selecting circuit 19 and the selector 20 of FIG. 4 are modified as shown in FIG. 9, where the control signal is load data defined for each field, and the time when a carry output is delivered from a counter 19' is changed depending upon the load data.

Figure 10:
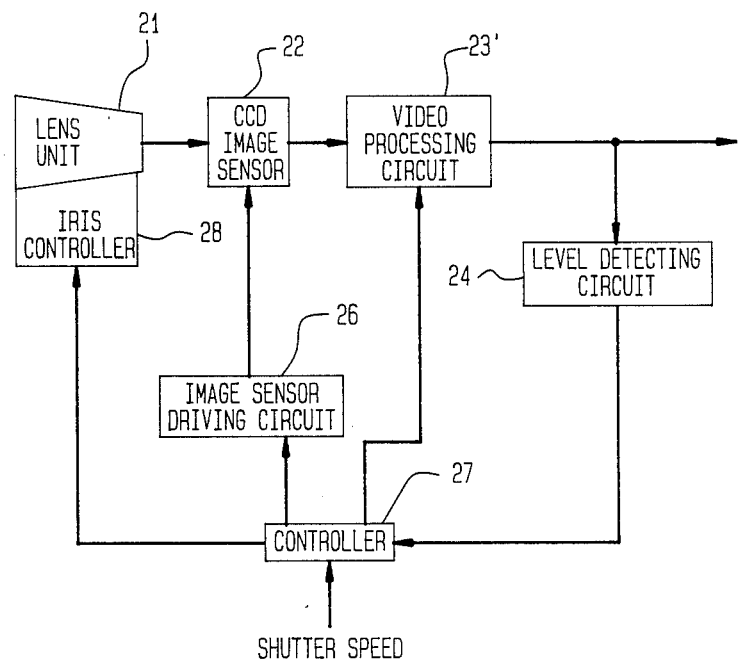
FIG. 10 is a block diagram of a video camera which employs the driving method of the present invention.

According to a fourth embodiment shown in FIG. 10, since a shutter speed is specified for a controller 27, the effective accumulation time of the CCD image sensor 22 is primarily determined depending upon the shutter speed, whereas an iris control circuit 28 coupled to the lens unit 21 and/or a video gain of a video processing circuit 23' are controlled secondarily to compensate the level change of the video signal depending upon the shutter speed. These control operations can be determined in various manners in accordance with imaging conditions. In one example of the controller 27, various sets of a iris value of the lens unit 21 and a gain of the video processing circuit 23' are previously determined in accordance with the shutter speed and the video signal level, and stored in a read-only memory. Therefore the iris value and the gain are automatically determined in response to the designated shutter speed and the detected video signal level through the read-only memory.

The invention was described in the foregoing by using an interline-transfer CCD image sensor. However, it need not be pointed out that the invention can also be adapted to an image sensor of a MOS structure. Furthermore, it is possible to add the needless charge transfer pulse to the transfer pulses.

What is claimed is:

1. A method of shortening an effective exposure time of an image sensor which includes a plurality of rows of light-sensing elements accumulating electrical charges in response to irradiated light, a plurality of first transfer registers respectively coupled to each row of said light-sensing elements and receiving accumulated charges transferred from said light-sensing elements, a plurality of storage register respectively coupled to each of said first transfer registers and storing the accumulated charges transferred from said first transfer registers therein, and a second transfer register coupled to said plurality of storage registers and transferring therethrough the stored charges transferred from said storage registers to output a video signal, said method comprising the steps of:

taking charges accumulated in each row of said light-sensing elements out of said elements to respective said first transfer registers at any time during an active video period when the stored charges are being transferred from said storage registers to said second transfer register;

transferring the taken-out charges from said first transfer registers to respective said storage registers in synchronism with the transfer of said stored charges from said storage registers to said second transfer register; and discarding the taken-out charges.

2. An image sensor comprising a plurality of rows of photodiodes, said photodiodes in each row being arranged in a vertical direction; a plurality of vertical transfer register means respectively coupled to said plurality of rows of photodiodes for receiving electric charges accumulated in said photodiodes and transferring said charges therethrough; storage means coupled to said vertical transfer register means for receiving electric charges delivered from said vertical transfer register means and storing the delivered charges; a horizontal transfer register means coupled to said storage means for transferring electric charges delivered from said storage means in a horizontal direction to produce a video signal; means for sweeping away electric charges stored in said vertical transfer register means and said storage means during a vertical blanking period; means for transferring electric charges accumulated in said photodiodes into said vertical transfer register means during said vertical blanking period and after said charges are swept away; means for transferring the electric charges delivered to said vertical transfer register means into said storage means during said vertical blanking period; means for transferring the electric charges from said storage means to said horizontal transfer register means during an active video period; and means for transferring electric charges accumulated in said photodiodes into said vertical transfer register means during said active video period while the charges stored in said storage means are being transferred from said storage means to said horizontal transfer register means.

3. A method for driving an image sensor which includes a plurality of photodiode arrays, each of said photodiode arrays including first photodiodes designated for an odd television field and second photodiodes designated for an even television field, each of said first photodiodes and each of said second photodiodes being alternately arranged, a plurality of vertical transfer register means respectively coupled to the plurality of said photodiode arrays for receiving electric charges accumulated in said first and second photodiodes, storage means coupled to the plurality of said vertical transfer register means for receiving electric charges delivered from the plurality of said vertical transfer register means, and horizontal transfer register means coupled to said storage means for transferring electric charges delivered from said storage means in a horizontal direction to produce a video signal, said method comprising:

a sweeping step for sweeping away electric charges stored in said vertical transfer register means and said storage means during one vertical blanking period for a television frame;

a first transfer step subsequent to said sweeping step for transferring the electric charges accumulated in said first photodiodes into said vertical transfer register means during said vertical blanking period;

a second transfer step subsequent to said first transfer step for transferring the electric charges delivered from said vertical transfer register means into said storage means during said vertical blanking period;

a third transfer step subsequent to said second transfer step for transferring electric charges accumulated in said second photodiodes into said vertical transfer register means;

a fourth transfer step subsequent to said third transfer step for transferring the electric charges stored in said storage means and in said vertical transfer register means into said horizontal transfer register means continuously for one television frame period to deliver a video signal of one television frame from said horizontal transfer register means;

a fifth transfer step for transferring electric charges accumulated in said first photodiodes into said vertical transfer register means, at an optional timing during said one television frame period; and a sixth transfer step subsequent to said fifth transfer step for transferring electric charges accumulated in said second photodiodes into said vertical transfer register means.

4. An image sensor comprising an array of photodiodes, a plurality of vertical transfer register means each coupled to a plurality of photodiodes for receiving electric charges accumulated in said photodiodes and transferring said charges therethrough; storage means coupled to said plurality of vertical transfer register means for storing electric charges delivered from said vertical transfer register means; a horizontal transfer register means coupled to said storage means for transferring electric charges delivered from said storage means to output a video signal; means for generating highspeed sweeping pulses to sweep away electric charges stored in said vertical transfer register means and said storage means during a vertical blanking period; means for generating a first transfer gate pulse after generation of said high-speed sweeping pulses to transfer electric charges accumulated in a plurality of photodiodes into said vertical transfer register means; means for generating highspeed transfer pulses after generation of said first transfer gate pulse to transfer the electric charges transferred to said vertical transfer register means from said vertical transfer register means into said storage means; and means for generating a second transfer gate pulse during an active video period to transfer electric charges accumulated in a plurality of photodiodes into said vertical transfer register means after generation of said high-speed transfer pulses and before generation of said high-speed sweeping pulses.

5. An image sensor comprising a plurality of photodiode arrays, each of said photodiode arrays containing first photodiodes designated for an odd television field and second photodiodes designated for an even television field, said first photodiodes and said second photodiodes being alternately arranged; a plurality of vertical transfer register means respectively coupled to the plurality of said photodiode arrays for receiving electric charges from said first photodiodes and said second photodiodes; storage means coupled to the plurality of said vertical transfer register means for receiving the electric charges from the plurality of said vertical transfer register means; horizontal transfer register means coupled to said storage means for transferring the electric charges delivered from said storage means in a horizontal direction to output a video signal; means for generating first high-speed pulses to sweep away electric charges contained in said vertical transfer register means and said storage means in the vertical direction during one vertical blanking period in one frame period; means for generating a first transfer pulse after generation of said first high-speed pulses to transfer electric charges accumulated in said first photodiodes to said vertical transfer register means during said vertical blanking period; means for generating second high-speed pulses after generation of said first transfer pulse to transfer the electric charges stored in said vertical transfer register means to said storage means during said vertical blanking period; means for generating a second transfer pulse after generation of said second high-speed pulses to transfer the electric charges accumulated in said second photodiodes to said vertical transfer register means; means for generating third transfer pulses after generation of said second transfer pulse to shift the electric charges stored in said storage means and in said vertical transfer register means into said horizontal transfer register means continuously during a television frame period; means for generating a fourth transfer pulse to transfer electric charges accumulated in said first photodiodes to said vertical transfer register means at a selected time point in said television frame period; and means for generating a fifth transfer pulse after said fourth transfer pulse by a predetermined period to transfer electric charges accumulated in said second photodiodes to said vertical transfer register means, whereby an effective accumulation period in said first and second photodiodes can be controlled by selecting said time point in generating said fourth transfer pulse.

6. A television camera apparatus comprising:

an image sensor for producing a video signal, said image sensor including a plurality of arrays each having a plurality of photodiodes arranged in a vertical direction; a plurality of vertical transfer registers respectively coupled to said plurality of arrays for receiving electric charges accumulated in said plurality of photodiodes; memory means coupled to said plurality of vertical transfer registers for receiving the electric charges delivered from said vertical transfer registers; and a horizontal transfer register coupled to said memory means for transferring the electric charges delivered from said memory means in a horizontal direction to output said video signal;

means for driving said image sensor, said driving means including a generator for generating a transfer pulse to transfer electric charges accumulated in said photodiodes into said vertical transfer registers at a selected timing during an active video period;

means for detecting a level of said video signal delivered from said image sensor; and means responsive to said level detected by said detecting means for selecting said timing.

7. A television camera apparatus comprising:

leans means for receiving light representative of an image, said lens means including an iris;

iris control means responsive to an iris control signal for controlling said iris included in said lens means;

an image sensor for producing a video signal, said image sensor including a plurality of arrays each having a plurality of photodiodes arranged in a vertical direction; a plurality of vertical transfer registers respectively coupled to said plurality of arrays for receiving electric charges accumulated in said plurality of photodiodes; memory means coupled to said plurality of vertical transfer registers for receiving the electric charges delivered from said vertical transfer register; and a horizontal transfer register coupled to said memory means for transferring the electric charges delivered from said memory means in a horizontal direction to output said video signal;

means for driving said image sensor, said driving means including a generator for generating a transfer pulse to transfer electric charges accumulated in said photodiodes into said vertical transfer registers at an optional timing during an active video period;

amplifier means responsive to a gain control signal for amplifying said video signal to produce a processed video signal;

means for detecting a level of said processed video signal to produce a level detection signal;

first control means responsive to a shutter speed signal for controlling said optional timing generated in said driving means; and second control means responsive to said level detection signal and said shutter speed signal for producing said iris control signal and said gain control signal to keep the level of said processed video signal within a predetermined range.

* * * * *